(12) United States Patent
Nagashima (10) Patent No.: US 7,755,014 B2
(45) Date of Patent: Jul. 13, 2010

(54) OPTICAL PICKUP DEVICE

(75) Inventor: Kenji Nagashima, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 742 days.

(21) Appl. No.: 11/702,559

(22) Filed: Feb. 6, 2007

(65) Prior Publication Data

US 2007/0183280 A1 Aug. 9, 2007

(30) Foreign Application Priority Data

Feb. 7, 2006 (JP) .............................. 2006-030163

(51) Int. Cl.
*G11B 7/00* (2006.01)

(52) U.S. Cl. ............ 250/201.5; 369/44.23; 369/112.07; 369/112.12; 349/201; 349/202

(58) Field of Classification Search .............. 250/201.5; 369/44.23, 109.01, 109.02, 112.03, 112.04, 369/112.05, 112.07, 112.11, 112.12; 349/201, 349/202

See application file for complete search history.

(56) References Cited

U.S. PATENT DOCUMENTS

| 5,909,422 | A  | * | 6/1999 | Kamatani | ..................... 369/94 |
| 6,218,655 | B1 |   | 4/2001 | Ogasawara et al. | ...... 250/201.5 |
| 7,511,887 | B2 | * | 3/2009 | Kawasaki et al. | ............ 359/569 |
| 2003/0072047 | A1 | * | 4/2003 | Funato et al. | .................. 359/15 |
| 2004/0013076 | A1 | * | 1/2004 | Funato et al. | .......... 369/112.12 |
| 2005/0002313 | A1 | * | 1/2005 | Hayashi | .................. 369/112.03 |
| 2005/0174918 | A1 | * | 8/2005 | Ogata | ..................... 369/112.02 |
| 2005/0276205 | A1 |   | 12/2005 | Heor et al. | ............. 369/112.02 |
| 2007/0097833 | A1 | * | 5/2007 | Okano et al. | ............. 369/112.1 |
| 2007/0183280 | A1 | * | 8/2007 | Nagashima | .............. 369/44.37 |

FOREIGN PATENT DOCUMENTS

| CN | 1722256 A | 1/2006 |
| DE | 60 2004 007 388 T2 | 4/2006 |
| JP | B2-3560805 | 6/2004 |
| JP | A-2004-219750 | 8/2004 |
| JP | A-2004-327005 | 11/2004 |
| JP | 1 605 449 B1 | 1/2008 |

* cited by examiner

*Primary Examiner*—John R Lee
(74) *Attorney, Agent, or Firm*—Morgan Lewis & Bockius LLP (57) ABSTRACT

An optical pickup device is equipped with a diffraction element (8) that includes liquid crystal, two transparent electrodes sandwiching the liquid crystal, and a liquid crystal control portion (21) with electrodes connected electrically to the transparent electrode for controlling a voltage to be applied between the two transparent electrodes. The diffraction element (8) is provided with two types of diffraction areas (19) and (20). Each of the diffraction areas (19) and (20) generate predetermined diffracted light only from one of different wavelengths of light beams. The transparent electrodes of the diffraction areas (19) and (20) that are patterned are connected electrically to different electrodes (22*c*) and (22*a*), respectively.

5 Claims, 3 Drawing Sheets

OPTICAL PICKUP DEVICE

This application is based on Japanese Patent Application No. 2006-030163 filed on Feb. 7, 2006, the contents of which are hereby incorporated by reference.

BACKGROUND OF THE INVENTION

1. Field of the Invention

The present invention relates to an optical pickup device for projecting light beam to an optical recording medium so that record of information or reproduction of information can be performed. In particular, the present invention relates to a structure of a diffraction element that is disposed in an optical system of the optical pickup device for generating diffracted light.

2. Description of Related Art

At present, optical recording media including a compact disc (hereinafter referred to as a CD) and a digital versatile disc (hereinafter referred to as a DVD) are widely available. In addition, recent years, in order to increase recording capacity of the optical recording medium, studies about high density recording on the optical recording medium have been proceeding. For example, high density optical recording media including an HD-DVD and a Blu-Ray Disc (hereinafter referred to as a BD) that are high quality DVDs are being available. When such an optical recording medium is read or written, an optical pickup device is used, which projects a light beam to the optical recording medium for writing and reading information.

An optical system of the optical pickup device is provided with a diffraction element that diffracts the light beam for various purposes. For example, the optical pickup device is required to adjust a focal point of the light beam emitted from a light source on a recording surface of the optical recording medium constantly and to make a position of a light beam spot follow a track formed on the optical recording medium. Therefore, some optical pickup devices are equipped with a diffraction element disposed in its optical system for obtaining a servo signal such as a focus error signal or a tracking error signal.

For example, Japanese patent No. 3560805 or JP-A-2004-327005 discloses a structure in which a diffraction element is disposed in an optical pickup device for the purpose described above. The structure described in Japanese patent No. 3560805 includes a liquid crystal panel that works as a diffraction element and is disposed at the vicinity of the semiconductor laser. This liquid crystal panel separates the light beam emitted from the semiconductor laser into a main beam (0 order light) and a sub beam (±1 st order light) so that a tracking control can be performed by using a so-called three-beam method. In addition, the liquid crystal panel is used as the diffraction element, and a power supply for applying a voltage to the liquid crystal panel is turned on and off so that a diffraction function can be switched.

Furthermore, in the optical pickup device that is described in JP-A-2004-327005 is provided with a common optical path for leading light beams emitted from a plurality of light sources having different wavelengths to an optical recording medium, and a diffraction element is disposed on the common optical path so that ±1 order diffracted light is obtained from the light beam entering the common optical path. In this structure, a tracking error signal is obtained by the arrangement of the diffraction element and is used for the tracking control. Moreover, in the optical pickup device that is described in JP-A-2004-327005, the diffraction element has two types of diffraction grating areas formed on the same surface, for example, because it is necessary to support two light beams having different wavelengths.

One of other purposes of arranging a diffraction element in an optical pickup device is to downsize the optical pickup device that can support a plurality of types of optical recording media. For example, JP-A-2004-219750 discloses such an optical pickup device. In this device, a light source and a light receiving portion are housed in a single case, and the diffraction element is used for switching an optical path of light projected to an optical recording medium and reflection light from the optical recording medium. A problem that may occur when the light source and the light receiving portion are housed in the single case is solved by a role of this diffraction element, so a size of the optical pickup device can be reduced. At this point, the diffraction element disclosed in JP-A-2004-219750 is made up of liquid crystal and that two diffraction elements are arranged so as to support two light beams having different wavelengths.

However, the optical pickup devices disclosed in above described Japanese patents No. 3560805, JP-A-2004-327005, and JP-A-2004-219750 are not sufficient from viewpoints described below. First, the diffraction element that is provided to the optical pickup device described in Japanese patent No. 3560805 has a disadvantage in the case where the optical pickup device is required to a plurality of optical recording medium. In this case, the diffraction element is necessary for each of light sources for each of optical recording media, so a size of the optical pickup device increases resulting in an increase of cost. Recently, the optical pickup device is required to support a plurality of optical recording medium. Therefore, the above-mentioned disadvantage may become an important problem.

Furthermore, the diffraction element that is provided to the optical pickup device described in JP-A-2004-327005 has a structure in which two different diffraction grating areas are formed, and a light beam having a wavelength that is diffracted by one of the diffraction grating areas is not diffracted by the other diffraction grating area. Manufacturing the diffraction element having the above-mentioned structure is technically difficult and requires a lot of cost if it is possible. Therefore, as a matter of fact, when the light passes through the diffraction grating area that should not diffract the light, undesired diffracted light that is called stray light may be generated in many cases. If the stray light is generated, many problems may occur, which includes a decrease of utilization factor of light, adverse effect to a reproduction signal and a servo signal, and deterioration of a signal.

Concerning these problems, it is difficult to separate a light beam for a CD from a light beam for a HD-DVD and a BD without generating the stray light because the former has a wavelength (e.g., 780 nm) and the latter has another wavelength (e.g., 405 nm), which are different from each other by a ratio substantially twice (or a ratio of integer multiple). This could be a serious problem in development of the optical pickup device supporting a HD-DVD and a BD that are developed actively recent years.

In addition, the diffraction element described in JP-A-2004-219750 is not sufficient for downsizing the optical pickup device, because it is necessary to arrange a plurality of diffraction elements for supporting a plurality of light beams having different wavelengths. Furthermore, there is also a problem of an increase of components resulting in an increase of manufacturing cost.

SUMMARY OF THE INVENTION

In view of the above described problems it is an object of the present invention to provide an optical pickup device equipped with a single diffraction element for obtaining desired diffracted light from plurality of light beams having different wavelengths without generation of undesired diffracted light when light beams of different wavelengths pass through the diffraction element.

To attain the object described above, an optical pickup device according to a first aspect of the present invention includes a plurality of light sources that emit light beams having different wavelengths, a condensing element for condensing the light beam emitted from the light source on a recording surface of the optical recording medium, and a diffraction element disposed between the light source and the condensing element, the diffraction element including liquid crystal, two transparent electrodes for sandwiching the liquid crystal, and a liquid crystal control portion with electrodes connected to the transparent electrodes for controlling a voltage to be applied between the two transparent electrodes, at least one of the transparent electrodes being patterned to be capable of generating predetermined diffracted light. The diffraction element is provided with a plurality of types of diffraction areas by forming different patterns on the transparent electrode, each of the plurality of types of diffraction areas is formed so as to generate the predetermined diffracted light of only one of wavelengths of the light beams emitted from the light sources, and, the patterned transparent electrodes for the types of diffraction areas are connected different electrodes, respectively.

As a second aspect of the present invention, in the optical pickup device having the structure described above, each of the plurality of types of diffraction areas is divided into a plurality of elongated areas, and the elongated areas are arranged continuously in a predetermined order in the direction perpendicular to the longitudinal direction so that each of the plurality of types of diffraction areas is adjacent to the different diffraction area and that the arrangement in the predetermined order is repeated.

As a third aspect of the present invention, in the optical pickup device having the structure described above, the diffraction element generates the diffracted light by diffracting reflection light that is reflected by the recording surface of the optical recording medium, so that a focus servo signal for controlling a focal point of a light beam that is emitted from the light source and passes through the condensing element to meet the recording surface and a tracking servo signal for controlling a spot of the light beam to follow a track on the optical recording medium, can be generated.

An optical pickup device according to a fourth aspect of the present invention includes a plurality of light sources that emit light beams having different wavelengths, a condensing element for condensing the light beam emitted from the light source on a recording surface of the optical recording medium, and a diffraction element disposed between the light source and the condensing element, the diffraction element including liquid crystal, two transparent electrodes for sandwiching the liquid crystal, and a liquid crystal control portion with electrodes connected to the transparent electrodes for controlling a voltage to be applied between the two transparent electrodes, at least one of the transparent electrodes being patterned to be capable of generating predetermined diffracted light. The diffraction element is provided with a plurality of types of diffraction areas by forming different patterns on the transparent electrode, each of the plurality of types of diffraction areas is divided into a plurality of elongated areas and is formed so as to generate a predetermined diffracted light of only one of wavelengths of the light beams emitted from the light sources. The elongated areas are arranged continuously in a predetermined order in the direction perpendicular to the longitudinal direction so that each of the plurality of types of diffraction areas is adjacent to the different diffraction area and that the arrangement in the predetermined order is repeated. The patterned transparent electrodes for the types of diffraction areas are connected different electrodes, respectively. The diffraction element generates diffracted light by diffracting reflection light that is reflected by the recording surface of the optical recording medium, so that a focus servo signal for controlling a focal point of a light beam that is emitted from the light source and passes through the condensing element to meet the recording surface and a tracking servo signal for controlling a spot of the light beam to follow a track on the optical recording medium can be generated.

According to the first aspect of the present invention, as to the optical pickup device having a diffraction element for obtaining diffracted light, desired diffracted light can be obtained from each of light beams having different wavelengths by a single diffraction element. Then, in accordance with a wavelength of a light beam emitted from the light source, it is possible to control not to apply a voltage to the transparent electrode in the area that does not generate the desired diffracted light so that the light beam is not diffracted in the area. Therefore, it is possible to control not to generate undesired diffracted light (stray light).

In addition, according to the second aspect of the present invention, in the optical pickup device having the above-mentioned first aspect, the plurality of types of diffraction areas formed on the diffraction element can be arranged so that incident light beam can be distributed uniformly to the plurality of types of diffraction areas. Therefore, desired diffracted light can be obtained easily from each of the light beams having different wavelengths.

In addition, according to the third aspect of the present invention, as to the optical pickup device having the first or the second aspect, when the diffraction element is disposed for obtaining a servo signal such as a focus error signal and a tracking error signal, it is possible to provide the optical pickup device that can obtain the reproduction signal and the servo signal with little deterioration by utilizing light effectively because of little stray light generated by the diffraction element.

In addition, according to the fourth aspect of the present invention, as to the optical pickup device equipped with a diffraction element for obtaining diffracted light, it is possible to obtain desired diffracted light from each of the light beams having different wavelengths by the single diffraction element. Then, in accordance with a wavelength of the light beam emitted from the light, a voltage is controlled not to be applied to the transparent electrode in the area where the desired diffracted light is not generated so that the light beam is not diffracted in the area. Therefore, undesired diffracted light (stray light) is not generated. In addition, the plurality of types of diffraction areas are arranged so that the incident light beam can be distributed uniformly to the plurality of types of diffraction areas. Therefore, desired diffracted light can be obtained easily from each of the light beams having different wavelengths.

DETAILED DESCRIPTION OF THE PREFERRED EMBODIMENTS

Now, an embodiment of the present invention will be described with reference to the attached drawings. It should be noted that the embodiment is merely an example, and the present invention is not limited to the embodiment.

Figure 1:
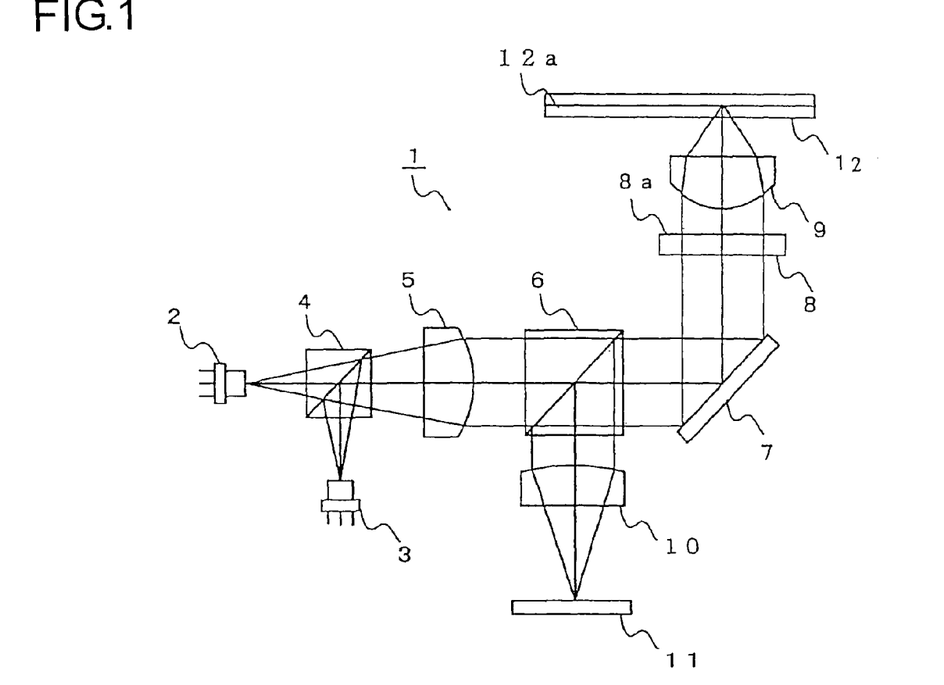
FIG. 1 is a schematic diagram to show a structure of an optical system of an optical pickup device according to an embodiment of the present invention.

FIG. 1 is a schematic diagram to show a structure of an optical system of an optical pickup device according to the present embodiment. Numeral 1 denotes an optical pickup device that reads information recorded on a recording surface 12a of an optical recording medium 12 that is one of two types of optical recording media including a DVD and a BD by projecting a light beam to the optical recording medium 12 so as to receive a reflection light from it or writes information on the recording surface 12a by projecting a light beam to the optical recording medium 12.

This optical pickup device 1 is equipped with a first light source 2, a second light source 3, a dichroic prism 4, a collimator lens 5, a beam splitter 6, an upstand mirror 7, a diffraction element 8, an objective lens 9, a detection lens 10, and a photo detector 11. Hereinafter, details of each optical element will be described.

The first light source 2 is a semiconductor laser that is capable of emitting a light beam of 650 nm band supporting a DVD, and the second light source 3 is a semiconductor laser that is capable of emitting a light beam of 405 nm band supporting a BD. Although the semiconductor laser emitting a light beam of a single wavelength is used for each of the light sources 2 and 3 in the present embodiment, the present invention is not limited to this structure. For example, it is possible to use a two-wavelength combination semiconductor laser that has two light emission points for emitting two types of light beams having different wavelengths.

The dichroic prism 4 permits the light beam emitted from the first light source 2 that emits a light beam for a DVD and reflects the light beam emitted from the second light source 3 that emits a light beam for a light beam for a BD. Thus, optical axes of the light beams emitted from the first light source 2 and the second light source 3 match each other. The light beam that passed through the dichroic prism 4 or was reflected by the same is sent to the collimator lens 5.

The collimator lens 5 converts the light beam that passed through the dichroic prism 4 into parallel rays. At this point the term "parallel rays" means light in which all the optical paths of the light beams emitted from the first light source 2 and the second light source 3 are substantially parallel with the optical axis. The light beam that was converted into parallel rays by the collimator lens 5 is sent to the beam splitter 6.

The beam splitter 6 works as a light separation element for separating an incident light beam. It permits the light beam sent from the collimator lens 5 to pass through so as to be led to the optical recording medium 12, while it reflects the reflection light reflected by the optical recording medium 12 so as to be lead to the photo detector 11. The light beam that passed through the beam splitter 6 is sent to the upstand mirror 7.

The upstand mirror 7 reflects the light beam that passed through the beam splitter 6 and leads it to the optical recording medium 12. The upstand mirror 7 is tilted from the optical axis of the light beam from the beam splitter 6 by 45 degrees, so the light beam reflected by the upstand mirror 7 has an optical axis that is substantially perpendicular to the recording surface 12a of the optical recording medium 12. The light beam reflected by the upstand mirror 7 is sent to the diffraction element 8.

The diffraction element 8 diffracts the incident light beam so as to generate 0 order light and ±1 st order light. The diffraction element 8 is made up of liquid crystal (not shown) and is capable of switching on and off of its diffraction function by controlling a voltage applied to transparent electrodes (not shown) that sandwich the liquid crystal. Thus, the diffraction element 8 has an advantage that it can obtain desired diffracted light of both the light beam having a wavelength for a DVD and the light beam having a wavelength for a BD by itself without generating undesired diffracted light. Details of the structure of the diffraction element 8 will be described later. The light beam that passed through the diffraction element 8 is sent to the objective lens 9.

The objective lens 9 condenses the light beam that passed through the diffraction element 8 on the recording surface 12a of the optical recording medium 12. In addition, the objective lens 9 is driven by an objective lens driving device (not shown) and can move in the vertical direction and the horizontal direction in FIG. 1. A position of the objective lens 9 is controlled based on a focus servo signal and a tracking servo signal. At this point, the diffraction element 8 is also mounted on the objective lens driving device so that it can move together with the objective lens 9 in the present embodiment. However, it is not always necessary to mount the diffraction element 8 on the objective lens driving device, and its structure can be modified in accordance with a structure of the optical system.

The reflection light reflected by the optical recording medium 12 passes through the objective lens 9 and the diffraction element 8 in this order and is reflected by the upstand mirror 7. After that, the reflection light is further reflected by the beam splitter 6 and is condensed by the detection lens 10 on a light receiving area (not shown) of the photo detector 11.

The photo detector 11 is provided with light receiving areas (not shown) for receiving 0 order light and ±1 st order light that are generated when the reflection light reflected by the optical recording medium 12 passes through the diffraction element 8. The light information received by the light receiving area is converted into an electric signal, which is output to an RF amplifier (not shown) or the like. In this case, the 0 order light received by the photo detector 11 is used as a signal for recording and reproducing information, while the ±1 st order light is used as a signal for the servo control. A relationship between the light beam that passed through the diffraction element 8 and the light receiving area will be described later.

Figure 2:
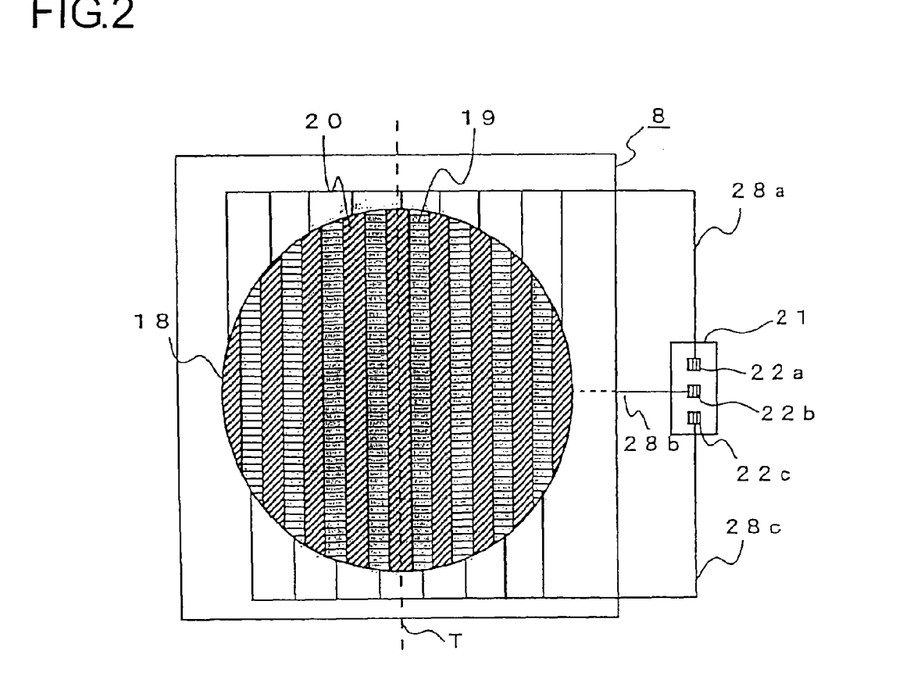
FIG. 2 is a schematic diagram of a diffraction element provided to the optical pickup device of the present embodiment when viewed from the front side.

Next, details of a structure of the diffraction element 8 will be described. FIG. 2 is a schematic diagram to show a structure of the diffraction element 8 of the present embodiment when viewed from the front of the surface 8a (see FIG. 1). As shown in FIG. 2, the diffraction element 8 is made up of a diffraction grating portion 18 and a liquid crystal control portion 21 for controlling a voltage to be applied to the transparent electrode (not shown). First, a structure of the diffraction grating portion 18 will be described.

The diffraction grating portion 18 is provided with two types of diffraction areas 19 and 20 (hatched areas with diagonal lines and horizontal lines, respectively) having different patterns formed on the transparent electrode so that predetermined diffracted light is obtained with respect to the light beam for a DVD and for the light beam for a BD, respectively. In the present embodiment, the diffraction area 19 generates diffracted light desired only for the light beam for a DVD, while the diffraction area 20 generates diffracted light desired only for the light beam for a BD. Each of the two types of diffraction areas 19 and 20 is made up of a plurality of elongated areas, and the elongated areas of the diffraction area 19 and the diffraction area 20 are arranged alternately.

Figure 3:
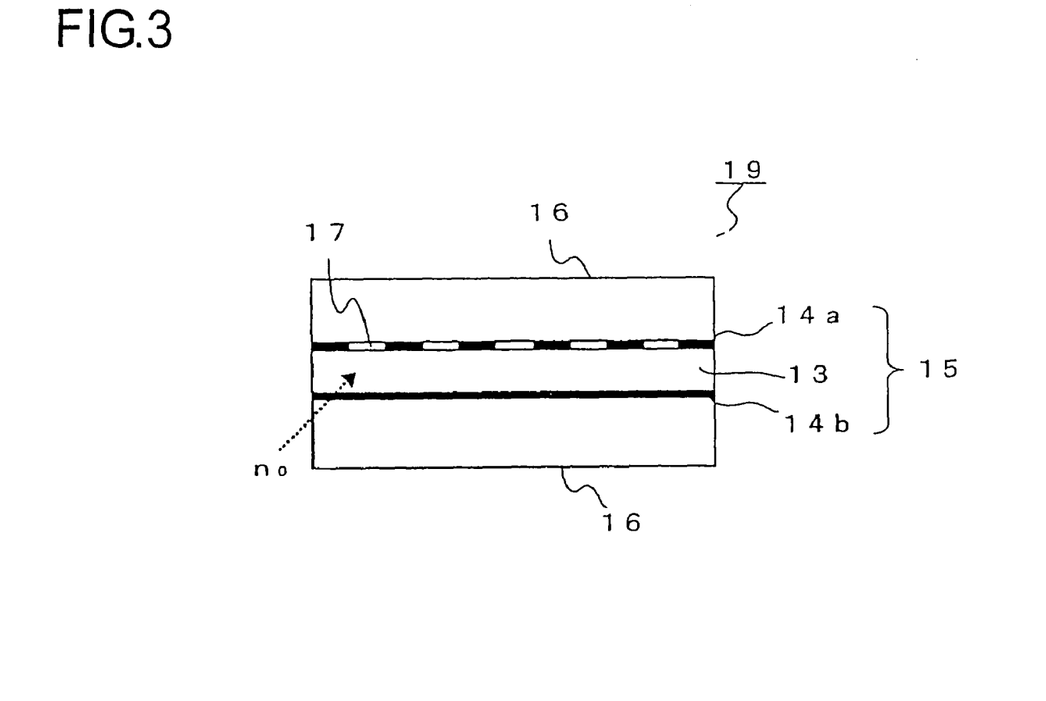
FIG. 3 is a schematic cross sectional view of a part of a diffraction area of the diffraction element provided to the optical pickup device of the present embodiment.

FIG. 3 is a schematic cross sectional view of a part of the diffraction area 19 provided to the diffraction element 8 of the present embodiment. Since the diffraction area 19 has the same structure as the diffraction area 20 except for a difference of the pattern formed on the transparent electrode, a part cut out from the diffraction area 19 will be described. As shown in FIG. 3, the diffraction area 19 is made up of a liquid crystal 13, transparent electrodes 14a, and 14b sandwiching the liquid crystal 13, and glass substrates 16 sandwiching a body 15 including the liquid crystal 13 and the transparent electrodes 14a and 14b.

The transparent electrode 14a is patterned, so the side where this transparent electrode 14a is provided is divided into a part with the transparent electrode and the other part 17 without the transparent electrode. In contrast, the transparent electrode 14b is not patterned, and the side where the transparent electrode 14b is provided has an entire transparent electrode that is a common electrode as a whole. At this point, the elongated areas of the same type on the patterned transparent electrode 14a are connected at their outer peripheries to be the same potential (see FIG. 2). However, neighboring elongated areas (i.e., different types of the diffraction areas) of the transparent electrode 14a are not connected to each other.

In addition, which one of the transparent electrodes 14a and 14b is patterned, is not limited to the structure of the present embodiment. For example, it is possible to form the same pattern on the transparent electrode 14b as the transparent electrode 14a. However, it is more preferable to make the transparent electrode 14b as a common electrode because the number of wires to be drawn out from the transparent electrode 14b and the number of electrodes for the connection are not increased. On the contrary to the structure of the present embodiment, it is possible to form the pattern only on the transparent electrode 14b and to make the transparent electrode 14a as a common electrode.

Figure 4:
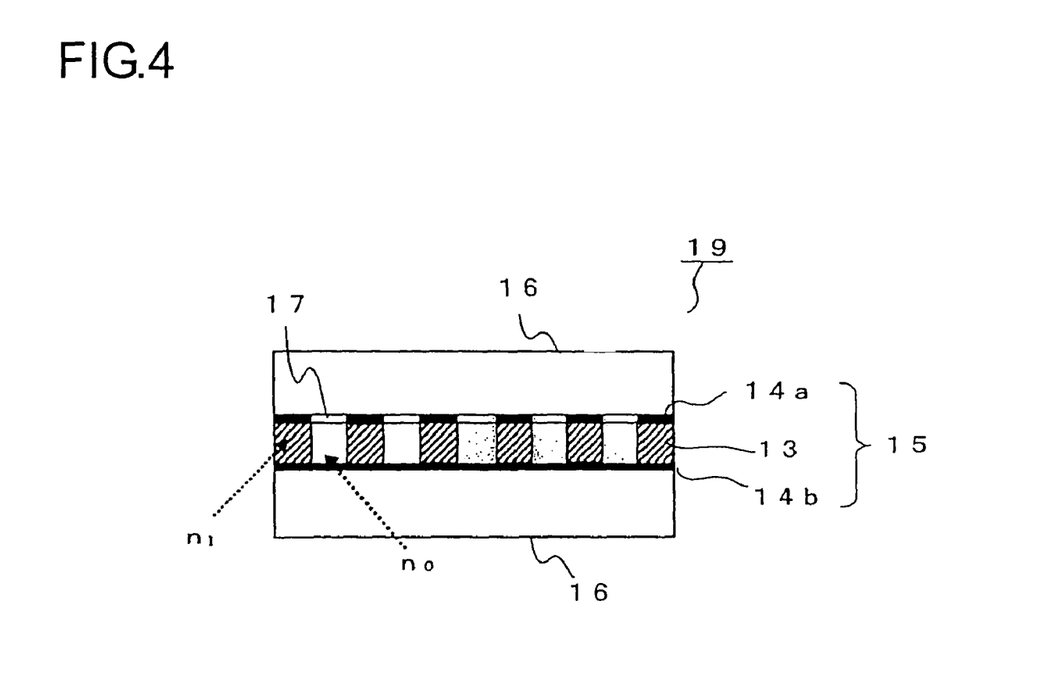
FIG. 4 is a schematic diagram of a state of the diffraction area shown in FIG. 3 where a voltage is applied between transparent electrodes.

FIG. 4 is a schematic diagram to show a state where a voltage is applied between the transparent electrodes 14a and 14b shown in FIG. 3. When a voltage is applied between the transparent electrodes 14a and 14b, the orientation direction of the liquid crystal 13 sandwiched between the transparent electrodes 14a and 14b is changed in a certain portion of the transparent electrode 14a. Therefore, as shown in FIG. 3, a difference is generated between a refractive index (n0) of the liquid crystal 13 under the part 17 without the transparent electrode 14a and a refractive index (n1) of the liquid crystal 13 under the part with the transparent electrode 14a. As a result, when a voltage is applied between transparent electrodes 14a and 14b, it works as a diffraction grating. In contrast, when the voltage is not applied between the transparent electrodes 14a and 14b, it does not work as a diffraction grating so that the light beam passes through it does not generate diffracted light.

In the structure of the present embodiment, the function of the diffraction grating is realized when a voltage is applied, and the function is not realized when the voltage is not applied. However, the opposite structure is possible, in which the function of the diffraction grating is realized when a voltage is not applied, and the function is not realized when the voltage is applied.

With reference to FIG. 2 again, the liquid crystal control portion 21 will be described. The liquid crystal control portion 21 is provided with three electrodes 22a-22c. The electrode 22a is connected via a lead wire 28a to the transparent electrode 14a of the diffraction area 20 that generates predetermined diffracted light of the light beam for a BD. The electrode 22c is connected via a lead wire 28c to the transparent electrode 14a of the diffraction area 19 that generates predetermined diffracted light of the light beam for a DVD. The electrode 22b is connected via a lead wire 28b to the transparent electrode 14b (see FIG. 3) to be a common electrode.

An action of the diffraction element 8 having the structure as described above will be described below with reference to FIG. 2. When the optical pickup device 1 is used for recording and reproducing information on a DVD, the first light source 2 emits the light beam having a wavelength for a DVD. In this case, no voltage is applied between the electrode 22a and the electrode 22b of the diffraction element 8, but a predetermined voltage is applied between the electrode 22c and the electrode 22b. As a result, the light beam that passes through the diffraction area 19 among light beams that pass through the diffraction element 8 generates predetermined diffracted light (0 order light and ±1st order light) since the diffraction area 19 has the function of the diffraction grating. However, the light beam that passes through the diffraction area 20 does not generate any diffracted light since the diffraction area 20 does not have the function of the diffraction grating.

In contrast, when the optical pickup device 1 is used for recording and reproducing information on a BD, the second light source 3 emits the light beam having a wavelength for a BD. In this case, no voltage is applied between the electrode 22c and the electrode 22b of the diffraction element 8, but a predetermined voltage is applied between the electrode 22a and the electrode 22b. As a result, the light beam that passes through the diffraction area 20 among light beams that pass through the diffraction element 8 generates predetermined diffracted light (0 order light and ±1 st order light) since the diffraction area 20 has the function of the diffraction grating. However, the light beam that passes through the diffraction area 19 does not generate any diffracted light since the diffraction area 19 does not have the function of the diffraction grating.

Figure 5:
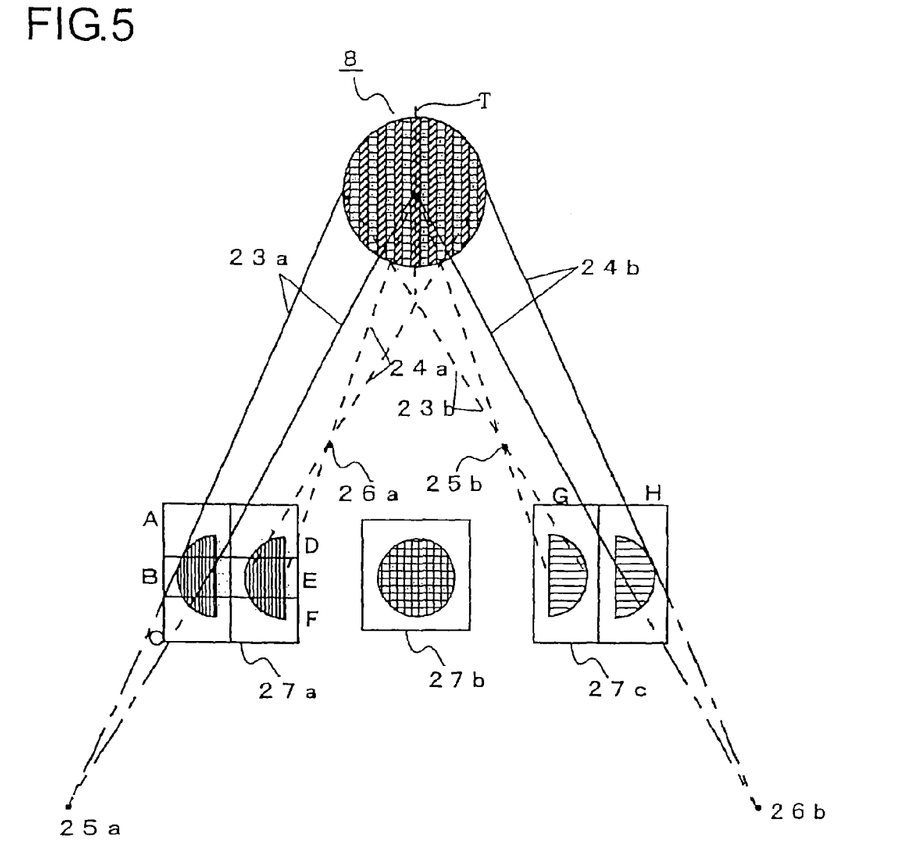
FIG. 5 is a schematic diagram for explaining a relationship between reflection light that passed through the diffraction element and light receiving areas that are provided to a photo detector in the optical pickup device of the present embodiment.

Therefore, when the reflection light that was reflected by the optical recording medium 12 passes through the diffraction element 8, it generates 0 order light that passes through the same without being diffracted, and diffracted 1 st order light (±1 st order light). Then, the 0 order light and the ±1 st order light reach the light receiving area of the photo detector 11 and generate a reproduction signal and a servo signal, respectively. Hereinafter, a relationship between the light beam that passed through the diffraction element 8 and the light receiving area of the photo detector 11 in the optical pickup device 1 of the present embodiment will be described with reference to FIG. 5. At this point, FIG. 5 is a schematic diagram for the description. In addition, the case of the light beam for a BD will be described with reference to FIG. 5, and description in the case of the light beam for a DVD will be omitted because they are basically the same.

The diffraction areas 19 and 20 of the diffraction element 8 shown in FIG. 2 are formed to be symmetric with respect to the center line T. More specifically, in the right side and the left side of this symmetry axis T, the diffraction areas 19 and 20 are respectively patterned to have different diffraction functions from each other. For this reason, the light beam that passes through the diffraction area 20 among the light beam for a BD that passes through the diffraction element 8 is diffracted so as to generate the predetermined diffracted light, which is different with respect to the symmetry axis T.

As shown in FIG. 5, there are rectangular light receiving areas 27a-27c on the photo detector 11. The light receiving area 27a receives the ±1 st order light 23a and 24a, the light receiving area 27b receives the 0 order light (not shown), and the light receiving area 27c receives the −1st order light 23b and 24b.

As shown in FIG. 5, the reflection light reflected by the BD (optical recording medium 12) is diffracted by the diffraction area 20 of the diffraction element 8. In the left side of the symmetry axis T, the ±1 st order light 23a among the diffracted light, is adjusted so that its focal point position 25a is behind the photo detector 11, while the −1 st order light 24a is adjusted so that its focal point position 25b is before the photo detector 11. On the contrary, in the right side of the symmetry axis T, the +1st order light 24a among the diffracted light is adjusted so that its focal point position 26a is before the photo detector 11, while the −1 st order light 24b is adjusted so that its focal point position 26b is behind the photo detector 11.

As a result, each of the +1 st order light 23a and 24a generated by diffractions in the left side and the right side of the symmetry axis T forms a semicircular spot on the light receiving area 27a as shown in FIG. 5. Similarly, each of the −1 st order light 23b and 24b generated by diffractions in the left side and the right side of the symmetry axis T forms a semicircular spot on the light receiving area 27c.

The light receiving area 27a is divided into total six areas (A, B, C, D, E, and F) as shown in FIG. 5. Therefore, a focus error signal can be generated from an operation by using a so-called spot size method. Supposing that signals output from the light receiving areas A-F are denoted by SA, SB, SC, SD, SE, and SF respectively, the focus error signal can be obtained by the operation of (SA+SC−SB)−(SD+SF−SE).

On the other hand, the light receiving area 27c is divided into two areas (G and H) as shown in FIG. 5. Therefore, a tracking error signal can be generated from an operation by using a so-called corrected far field method. Supposing that signals output from the light receiving areas G and H are denoted by SG, SH respectively, the tracking error signal can be obtained by the operation of SG-SH. At this point, the reproduction signal is obtained from the 0 order light that is received by the light receiving area 27b in the present embodiment.

Although the focus error signal is obtained from the +1 st order light and the tracking error signal is obtained from the −1 st order light generated by diffraction in the diffraction element 8 in the present embodiment, it is possible to obtain the focus error signal from the −1 st order light and the tracking error signal from the +1 st order light. Furthermore, in the present embodiment, two areas having different diffraction functions are formed in each of the diffraction areas 19 and 20 of the diffraction element 8. Then, the focus error signal is obtained by the spot size method, and the tracking error signal is obtained by the corrected far field method. However, the present invention should not be limited to this structure. It is possible to obtain the focus error signal and the tracking error signal by changing the number of areas having different diffraction functions and by other methods (for example, an astigmatism method as a focus control method and a differential push-pull method as a tracking control method).

Figure 6:
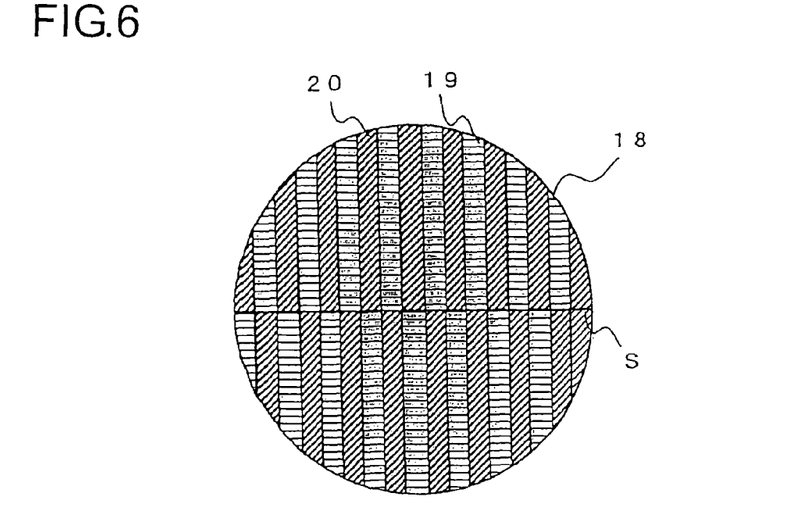
FIG. 6 shows a variation of the structure of the diffraction element.

In the present embodiment described above, each of the diffraction areas 19 and 20 for each wavelength provided to the diffraction element 8 is divided into a plurality of elongated areas, which are arranged so that the diffraction areas 19 and 20 are arranged alternately. However, the present invention should not always be limited to this structure, but various modifications are permitted within a scope of the present invention. For example, it is possible that each of the diffraction areas 19 and 20 is not divided into a plurality of areas but is arranged as one area. In addition, it is possible that each of the diffraction areas 19 and 20 is divided into plurality of areas so that the diffraction areas 19 and 20 are arranged alternately in a concentric manner. However, it is more preferable that the elongated areas be arranged for each of the diffraction areas 19 and 20 as the present embodiment because that the incident light beam can be distributed equally to the diffraction areas 19 and 20. In addition, as the method of distributing the light beam equally in this manner, it is effective to change arrangement order of the diffraction areas 19 and 20 between an upper half and a lower half of the diffraction grating portion 18 of the diffraction element 8 that is divided equally into the upper half and the lower half by the line S as shown in FIG. 6.

In addition, although the optical pickup device 1 of the present embodiment supports a DVD and a BD, this structure can be modified variously within the scope of the present invention. For example, it is possible to structure the optical pickup device to support a CD and a BD, or support a CD and a DVD. Although the optical pickup device 1 of the present embodiment supports two types of optical recording media, it is possible to structure the optical pickup device to support three or more types of optical recording media. In this case, the diffraction element is provided with three or more types of diffraction areas supporting three or more types of light beams having different wavelengths. In this case too, it is preferable to divide each of the three or more types of diffraction areas into a plurality of elongated areas and to arrange them so that the diffraction areas are arranged in a predetermined order repeatedly, in order to distribute the light beam entering the diffraction element 8 equally to the three or more types of diffraction areas.

In addition, although the optical pickup device 1 of the present embodiment is provided with the diffraction element 8 for obtaining the focus error signal and the tracking error signal, this structure can be modified within a scope of present invention. For example, it is possible to structure the optical pickup device having a two-wavelength combination light source for obtaining the tracking error signal by the three-beam method, so that a diffraction element is disposed in the vicinity of the two-wavelength combination light source. Then, the diffraction element is provided with two types of diffraction areas for generating a predetermined main beam (0 order light) and a sub beam (±1 st order light) for only either one of the two light beams having different wavelengths. Then, a voltage to be applied is switched in accordance with the wavelength of the light beam emitted from the light source so that only one of the two types of diffraction areas has a diffraction function. According to this structure, undesired diffracted light is not generated so that an optical pickup device capable of recording and reproducing in high quality can be obtained.

The optical pickup device according to the present invention includes a plurality of light sources for emitting light beams having different wavelengths, a condensing element for condensing the light beam emitted from the light source on a recording surface of the optical recording medium, a diffraction element disposed between the light source and the condensing element, the diffraction element including liquid crystal, two transparent electrodes for sandwiching the liquid crystal, and a liquid crystal control portion with electrodes connected to the transparent electrodes for controlling a voltage to be applied between the two transparent electrodes, at least one of the transparent electrodes being patterned to be capable of generating predetermined diffracted light. The diffraction element is provided with a plurality of types of diffraction areas by forming different patterns on the transparent electrode, each of the plurality of types of diffraction areas is formed so as to generate the predetermined diffracted light of only one of wavelengths of the light beams emitted from the light sources, and the patterned transparent electrodes for the types of diffraction areas are connected different electrodes, respectively.

As a result, it is possible that a desired diffracted light from each of the light beams having different wavelengths, is obtained by only one diffraction element. Further, it is possible that undesired diffracted light (stray light) is not generated from each of the light beams having different wavelengths.

Furthermore, in the optical pickup device described above, each of the plurality of types of the diffraction areas is divided into a plurality of elongated areas, and the elongated areas are arranged continuously in a predetermined order in the direction perpendicular to the longitudinal direction so that each of the plurality of types of diffraction areas is adjacent to the different diffraction area and that the arrangement in the predetermined order is repeated. Thus, the incident light beam can be distributed equally to the plurality of types of diffraction areas so that desired diffracted light can be obtained from each of the light beams having different wavelengths.

What is claimed is:

1. An optical pickup device, comprising:
a plurality of light sources that emit light beams having different wavelengths;
a condensing element for condensing the light beam emitted from the light sources on a recording surface of an optical recording medium; and
a diffraction element disposed between the light sources and the condensing element, the diffraction element including liquid crystal, two transparent electrodes for sandwiching the liquid crystal, and a liquid crystal control portion with electrodes connected to the transparent electrodes for controlling a voltage to be applied between the two transparent electrodes, at least one of the transparent electrodes being patterned to be capable of generating predetermined diffracted light by diffracting reflection light that is reflected by the recording surface of the optical recording medium, wherein
the diffraction element is provided with a plurality of types of diffraction areas by forming different patterns on the transparent electrodes,
each of the plurality of types of diffraction areas is formed so as to generate the predetermined diffracted light of only one of wavelengths of the light beams emitted from the light sources, and
the patterned transparent electrodes for the types of diffraction areas are connected to different electrodes, respectively.

2. The optical pickup device according to claim 1, wherein each of the plurality of types of diffraction areas is divided into a plurality of elongated areas, and the elongated areas are arranged continuously in a predetermined order in a direction perpendicular to a longitudinal direction so that each of the plurality of types of diffraction areas is adjacent to a different diffraction area and that the arrangement in the predetermined order is repeated.

3. The optical pickup device according to claim 1, wherein the diffraction element generates diffracted light by diffracting reflection light that is reflected by the recording surface of the optical recording medium, so that a focus servo signal for controlling a focal point of a light beam that is emitted from the light sources and passes through the condensing element to meet the recording surface and a tracking servo signal for controlling a spot of the light beam to follow a track on the optical recording medium can be generated.

4. The optical pickup device according to claim 2, wherein the diffraction element generates diffracted light by diffracting reflection light that is reflected by the recording surface of the optical recording medium, so that a focus servo signal for controlling a focal point of a light beam that is emitted from the light sources and passes through the condensing element to meet the recording surface and a tracking servo signal for controlling a spot of the light beam to follow a track on the optical recording medium can be generated.

5. An optical pickup device, comprising:
a plurality of light sources that emit light beams having different wavelengths;
a condensing element for condensing the light beam emitted from the light sources on a recording surface of an optical recording medium; and
a diffraction element disposed between the light sources and the condensing element, the diffraction element including liquid crystal, two transparent electrodes for sandwiching the liquid crystal, and a liquid crystal control portion with electrodes connected to the transparent electrodes for controlling a voltage to be applied between the two transparent electrodes, at least one of the transparent electrodes being patterned to be capable of generating predetermined diffracted light by diffracting reflection light that is reflected by the recording surface of the optical recording medium, wherein
the diffraction element is provided with a plurality of types of diffraction areas by forming different patterns on the transparent electrodes,
each of the plurality of types of diffraction areas is divided into a plurality of elongated areas and is formed so as to generate a predetermined diffracted light of only one of wavelengths of the light beams emitted from the light sources,
the elongated areas are arranged continuously in a predetermined order in a direction perpendicular to a longitudinal direction so that each of the plurality of types of diffraction areas is adjacent to a different diffraction area and that the arrangement in the predetermined order is repeated, the patterned transparent electrodes for the types of diffraction areas are connected to different electrodes, respectively, and the diffraction element generates diffracted light by diffracting reflection light that is reflected by the recording surface of the optical recording medium, so that a focus servo signal for controlling a focal point of a light beam that is emitted from the light sources and passes through the condensing element to meet the recording surface and a tracking servo signal for controlling a spot of the light beam to follow a track on the optical recording medium can be generated.

* * * * *